(12) United States Patent
Furui et al.

(10) Patent No.: US 11,070,039 B2
(45) Date of Patent: Jul. 20, 2021

(54) INSULATION SPACER AND GAS INSULATION SHUTOFF APPARATUS USING THE INSULATION SPACER

(71) Applicant: Hitachi, Ltd., Tokyo (JP)

(72) Inventors: Hirokazu Furui, Tokyo (JP); Jun Nukaga, Tokyo (JP); Makoto Hirose, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/608,410

(22) PCT Filed: May 14, 2018

(86) PCT No.: PCT/JP2018/018507
§ 371 (c)(1),
(2) Date: Oct. 25, 2019

(87) PCT Pub. No.: WO2018/212124
PCT Pub. Date: Nov. 22, 2018

(65) Prior Publication Data
US 2020/0083678 A1    Mar. 12, 2020

(30) Foreign Application Priority Data

May 19, 2017   (JP) .............................. JP2017-099830

(51) Int. Cl.
*H02B 13/045* (2006.01)
*H02B 13/055* (2006.01)
*H02G 5/06* (2006.01)

(52) U.S. Cl.
CPC ......... *H02B 13/045* (2013.01); *H02B 13/055* (2013.01); *H02G 5/06* (2013.01)

(58) Field of Classification Search
CPC ....... H02B 13/045; H02B 13/055; H02G 5/06
(Continued)

(56) References Cited

U.S. PATENT DOCUMENTS

| 4,667,061 A * | 5/1987 | Ishikawa ................ H02G 5/063 |
| | | 174/14 R |
| 6,002,085 A * | 12/1999 | Utsumi .................. H02G 5/068 |
| | | 174/137 A |

(Continued)

FOREIGN PATENT DOCUMENTS

| EP | 0588359 A2 * | 3/1994 | ............. H02G 5/068 |
| JP | 6-153342 A | 5/1994 | |

(Continued)

OTHER PUBLICATIONS

JP 2016-101080 English Translation (Year: 2016).*

(Continued)

*Primary Examiner* — Anatoly Vortman
(74) *Attorney, Agent, or Firm* — Crowell & Moring LLP (57) ABSTRACT

An insulating spacer and a gas insulation shutoff apparatus each having a high dielectric strength against adhesion of a metal foreign substance are provided without increasing size or complicating a shape of the insulating spacer. In an insulating spacer of a gas insulation shutoff apparatus including a grounded tank filled with an insulating gas, a high-voltage conductor provided within the grounded tank, and the insulating spacer supporting and fixing the high-voltage conductor within the grounded tank, the insulating spacer includes a conductor to be connected to the high-voltage conductor, an insulating structure supporting and fixing the conductor within the grounded tank, and a non-linear resistance layer provided on a creepage surface of the insulating structure, and the nonlinear resistance layer is provided in a portion to be a high-field portion of the creepage surface of the insulating structure.

8 Claims, 6 Drawing Sheets

(58) Field of Classification Search
USPC .......................................................... 361/612
See application file for complete search history.

(56) References Cited

U.S. PATENT DOCUMENTS

| | | | |
|---|---|---|---|
| 9,349,501 B2* | 5/2016 | Miyamoto | ............. H01H 33/64 |
| 2015/0262773 A1* | 9/2015 | Yoshimura | ............ H01H 33/161 |
| | | | 200/48 R |
| 2015/0357801 A1 | 12/2015 | Nakauchi et al. | |
| 2016/0225486 A1* | 8/2016 | Di-Gianni | ............ H02B 13/035 |
| 2016/0268784 A1* | 9/2016 | Yoshimura | ............ H02B 13/045 |
| 2017/0194775 A1 | 7/2017 | Kainaga et al. | |
| 2019/0372318 A1* | 12/2019 | Kawano | ............... H02B 13/035 |

FOREIGN PATENT DOCUMENTS

| | | | | |
|---|---|---|---|---|
| JP | 8-149667 A | | 6/1996 | |
| JP | 09023519 A | * | 1/1997 | ............. H02G 5/068 |
| JP | 2005-327580 A | | 11/2005 | |
| JP | 2005340582 A | * | 12/2005 | ............... H05K 7/20 |
| JP | 2012-110206 A | | 6/2012 | |
| JP | 2014-7887 A | | 1/2014 | |
| JP | 2016-101080 A | | 5/2016 | |
| JP | 2016101080 A | * | 5/2016 | ............... H02G 5/06 |
| WO | WO-2009104292 A1 | * | 8/2009 | ........... H05K 1/0373 |
| WO | WO-2015198420 A1 | * | 12/2015 | ........... H02B 13/035 |

OTHER PUBLICATIONS

International Search Report (PCT/ISA/210) issued in PCT Application No. PCT/JP2018/018507 dated Jun. 26, 2018 with English translation (seven pages).

* cited by examiner

INSULATION SPACER AND GAS INSULATION SHUTOFF APPARATUS USING THE INSULATION SPACER

TECHNICAL FIELD

The present invention relates to an insulation spacer and a gas insulation shutoff apparatus using the insulation spacer.

BACKGROUND ART

In a facility such as a high-voltage power plant or a substation equipped with a high-voltage, high-capacity power system, a gas insulation shutoff apparatus is disposed to protect such equipment. Recently, the gas insulation shutoff apparatus is required to be used in underground substations in urban areas or to be improved in economy, and thus compactification of devices is required.

The gas insulation shutoff apparatus is constituted by devices such as a breaker, a disconnector, a grounding switch, an instrument current transformer, and an instrument transformer. Each device is electrically insulated by a structure where a high-voltage conductor is disposed in a grounded container filled with $SF_6$ gas having a dielectric strength about three times higher than air while being supported and fixed by an insulating spacer.

Although the gas insulation shutoff apparatus uses $SF_6$ gas and thus has a high insulation reliability as described above, its dielectric strength is extremely reduced due to a metal foreign substance contaminated into the grounded container during manufacture or occurring during operation, which may affect stable power supply. To describe more specifically, although the metal foreign substance contaminated into the grounded container remains at rest on a bottom surface of the grounded container during suspension of the gas insulation shutoff apparatus, the metal foreign substance is charged by an electric field generated during operation and receives electrostatic force in a frying direction from the bottom surface of the grounded container, and moves within the container. At that time, the metal foreign substance may adhere to a creepage surface of the insulating spacer. Adhesion of the metal foreign substance to the creepage surface of the insulating spacer leads to electric field concentration to the vicinity of a triple point formed by the spacer creepage surface, the metal foreign substance, and the $SF_6$ gas. Partial discharge occurring at a tip of the metal foreign substance is changed into streamer discharge by such electric field concentration, and the discharge proceeds on the creepage surface of the insulating spacer toward the high-voltage conductor or the grounded container, leading to dielectric breakdown.

As described above, adhesion of the metal foreign substance to the creepage surface of the insulating spacer may lead to discharge, resulting in a reduction in dielectric strength of the apparatus. The insulating spacer is typically increased in size to reduce the creeping electric field in order to secure insulating performance against adhesion of the metal foreign substance. Alternatively, the insulating spacer has a complicated shape such as a conical shape to extend a creeping distance to have an enough insulating distance.

For example, patent literature 1 shows a technique to suppress adhesion of the metal foreign substance to the insulating spacer. The patent literature 1 discloses a gas insulation shutoff apparatus, which uses an insulating structural member to support a high-voltage conductor receiving a high voltage in a grounded tank filled with an insulating gas. The gas insulation shutoff apparatus is characterized by having a barrier structure section integrally formed with the insulating structural member between the grounded tank and the high-voltage conductor. The barrier structure section is a cylindrical barrier structure section seamlessly formed coaxially with the high-voltage conductor so as to surround a connection between the high-voltage conductor and a discoidal insulating structural member, or a disc-shape barrier structure section seamlessly formed coaxially with a columnar insulating structural member, and a nonlinear resistance film is formed on a creepage surface of the barrier structure section such that its surface resistance is reduced with an increase in electric field.

In the patent literature 1, the cylindrical barrier structure section, which is seamlessly formed coaxially with the high-voltage conductor so as to surround the high-voltage conductor, is formed integrally with the insulating spacer. The high-voltage conductor is surrounded by the barrier structure section to suppress adhesion of the metal foreign substance to the vicinity, which is to be a high field region, of the high-voltage conductor.

CITATION LIST

Patent Literature

Japanese Unexamined Patent Publication No. 2014-007887.

SUMMARY OF INVENTION

Technical Problem

As described above, in the existing gas insulation shutoff apparatus, the insulating spacer is increased in size and complicated in shape to extend the creeping distance in order to secure the insulating performance against the metal foreign substance. In addition, as in the patent literature 1, the cylindrical barrier structure section is formed integrally with the insulating spacer to surround the high-voltage conductor in order to suppress adhesion of the metal foreign substance to the vicinity, which is to be a high field region, of the high-voltage conductor. Such an increase in size or complication of the shape of the insulating spacer is disadvantageous for compactification or a reduction in cost of the gas insulation shutoff apparatus or a connection device.

In consideration of the above-described circumstances, an object of the invention is to provide an insulating spacer and a gas insulation shutoff apparatus each having a high dielectric strength against adhesion of a metal foreign substance without increasing size or complicating a shape of the insulating spacer.

Solution to Problem

To achieve the above object, the invention provides an insulating spacer of a gas insulation shutoff apparatus including a grounded tank filled with an insulating gas, a high-voltage conductor provided within the grounded tank, and the insulating spacer supporting and fixing the high-voltage conductor within the grounded tank. The insulating spacer includes a conductor to be connected to the high-voltage conductor, an insulating structure supporting and fixing the conductor within the grounded tank, and a nonlinear resistance layer provided on a creepage surface of the insulating structure. The nonlinear resistance layer is provided in a portion to be a high-field portion of the creepage surface of the insulating structure.

In addition, the invention provides a gas insulation shutoff apparatus including a grounded tank filled with an insulating gas, a high-voltage conductor provided within the grounded tank, and an insulating spacer supporting and fixing the high-voltage conductor within the grounded tank. The insulating spacer includes a conductor to be connected to the high-voltage conductor, an insulating structure supporting and fixing the conductor within the grounded tank, and a nonlinear resistance layer provided on a creepage surface of the insulating structure. The nonlinear resistance layer is provided in a portion to be a high-field portion of the creepage surface of the insulating structure.

A more specific configuration of the invention is described in claims.

Advantageous Effects of Invention

According to the invention, an insulating spacer and a gas insulation shutoff apparatus, each having a high dielectric strength against adhesion of a metal foreign substance, can be provided without increasing size or complicating a shape of the insulating spacer.

Other issues, configurations, and effects are more clarified from the following description of embodiments.

DESCRIPTION OF EMBODIMENTS

Basic Idea of the Invention

To investigate a configuration of an insulating spacer achieving the above object, the inventors have specified an area to be a high-field area of a creepage surface of the insulating spacer and designed a nonlinear resistance layer to be provided in the area. According to such a configuration, even if a metal foreign substance adheres to the creepage surface of the insulating spacer, dielectric strength can be sufficiently maintained by the nonlinear resistance layer provided on the creepage surface. Further, the insulating spacer is improved in dielectric strength without increasing size or complicating a shape of the insulating spacer unlike in the past, making it possible to achieve compactification and cost reduction of the gas insulation shutoff apparatus or a connection device. Hereinafter, the invention is described with reference to drawings.

Figure 1:
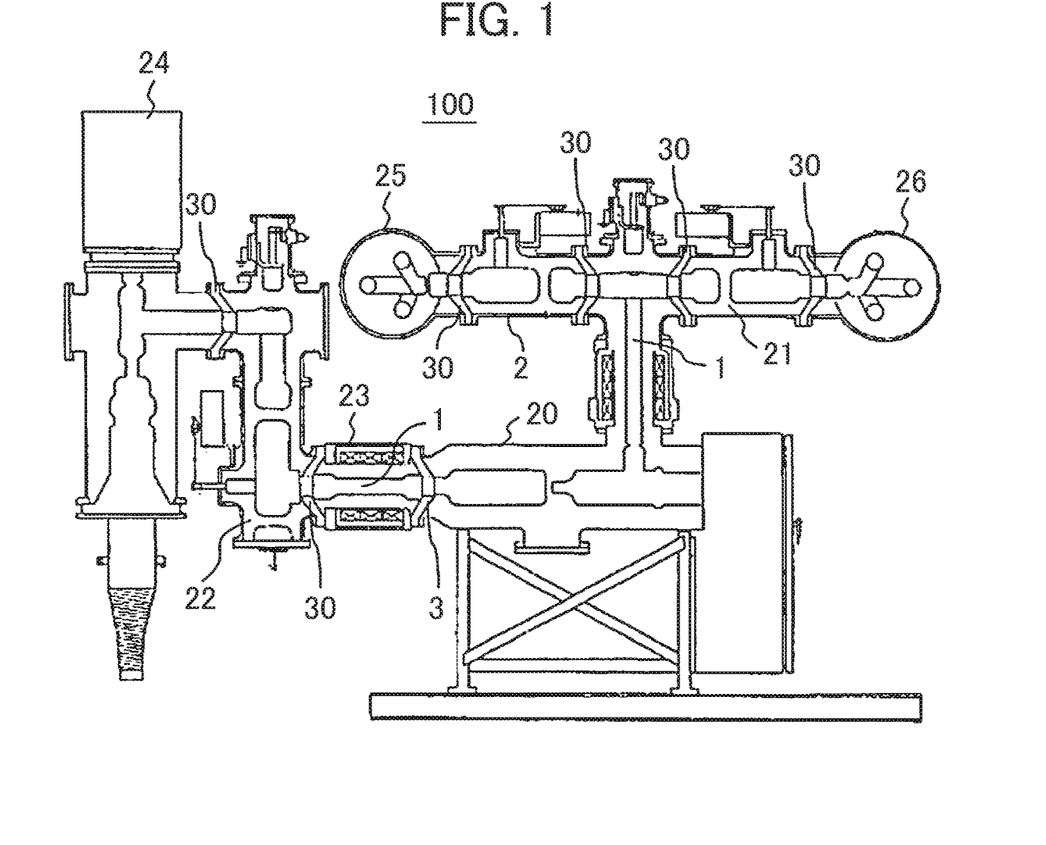
FIG. 1 is a schematic sectional view of a gas insulation shutoff apparatus of the invention.

First Embodiment (1) Configurations of Gas Insulation Shutoff Apparatus and Insulating Spacer FIG. 1 is a schematic sectional view of a gas insulation shutoff apparatus of the invention. As shown in FIG. 1, a gas insulation shutoff apparatus 100 includes a grounded tank 2 filled with an insulating gas (such as $SF_6$ gas), a high-voltage conductor 1 provided within the grounded tank 2, an insulating spacer (hereinafter, simply referred to as "spacer" in some cases) 30 that supports and fixes the high-voltage conductor 1 within the grounded tank 2. The gas insulation shutoff apparatus 100 includes other compositional devices such as a breaker 20, a disconnector 21, a grounding switch 22, a current transformer 23, a transformer 24, and generatrices 25 and 26.

The high-voltage conductor 1 is a cylindrical metal (such as aluminum or copper) conductor, and the grounded tank 2 is a cylindrical metal container. The high-voltage conductor 1 is supported and fixed by the insulating spacer 30 within the grounded tank 2 while being isolated from the grounded tank 2. The insulating spacer 30 is tucked in the grounded tank 2 to be mounted within the grounded tank 2 so as to intersect a central axis of the grounded tank 2.

Although FIG. 1 shows the insulating spacer 30 having a conical shape (conical spacer), the insulating spacer 30 may include any of other spacers having various shapes, such as a disc-like spacer and a columnar post spacer. FIGS. 2A, 2B, 4, and 6 are described with an exemplary disc-like spacer for better viewability.

Figure 2A:
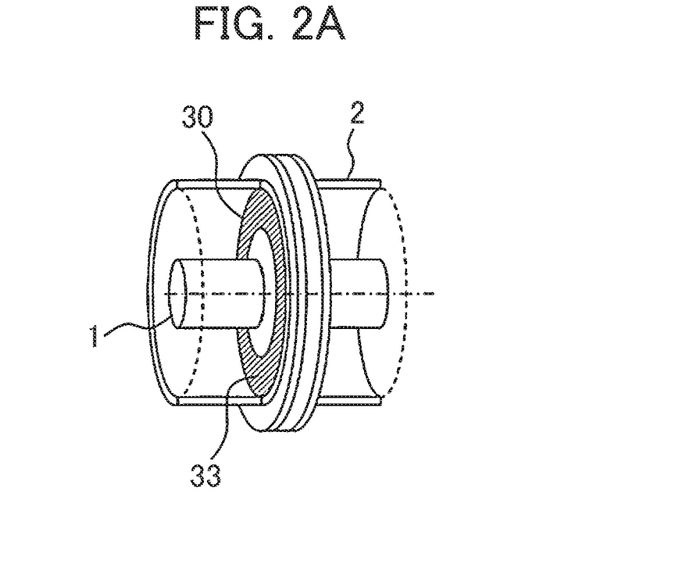
FIG. 2A is an expanded perspective view of the periphery of an insulating spacer in FIG. 1.
Figure 2B:
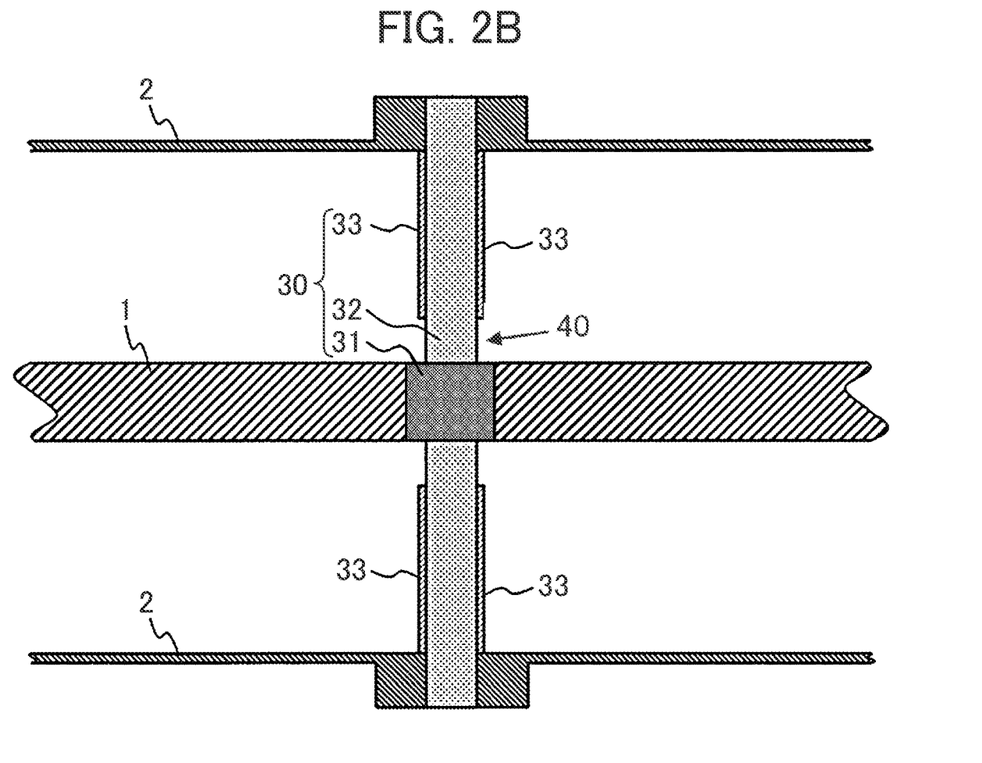
FIG. 2B is an expanded view of the periphery of the insulating spacer in FIG. 1.

FIG. 2A is an expanded perspective view of the periphery of the insulating spacer in FIG. 1, and FIG. 2B is an expanded view of the periphery of the insulating spacer in FIG. 1. As shown in FIGS. 2A and 2B, the insulating spacer 30 includes a conductor (embedded conductor) 31 connected to the high-voltage conductor 1, an insulating structure 32 supporting and fixing the conductor 31 to the grounded tank 2, and a nonlinear resistance layer 33 provided on a creepage surface of the insulating structure 32. The nonlinear resistance layer 33 is provided on a wide surface on either side of the insulating structure 32 so as to surround the periphery of the high-voltage conductor 1 with a predetermined distance from the high-voltage conductor 1.

Figure 3:
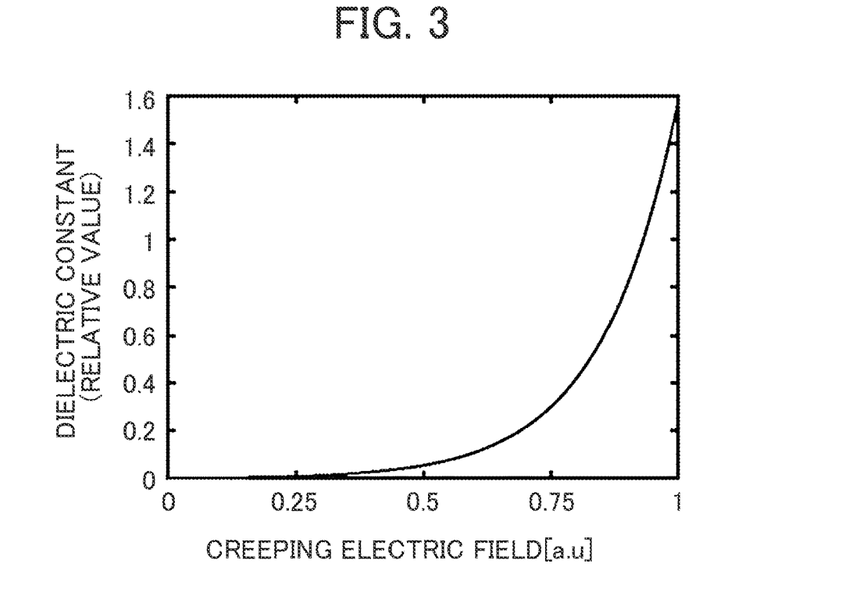
FIG. 3 is a graph showing a relationship between electric conductivity and a creeping electric field of a nonlinear resistance material.

The nonlinear resistance layer 33 is made of a nonlinear resistance material. FIG. 3 is a graph showing a relationship between electric conductivity and a creeping electric field of the nonlinear resistance material. As shown in the field-to-conductivity characteristics of FIG. 3, the nonlinear resistance material has a conductivity that drastically increases above an electric field value as a threshold. A specific material of the nonlinear resistance material is described later.

Figure 4:
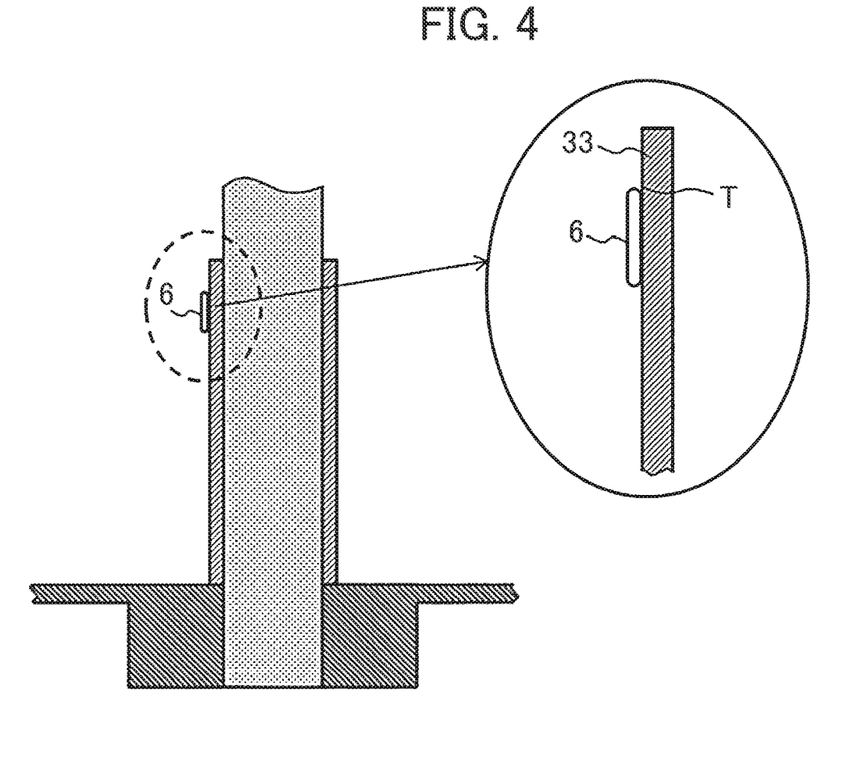
FIG. 4 shows a state where a metal foreign substance adheres to the insulating spacer.

FIG. 4 shows a state where a metal foreign substance adheres to the insulating spacer. As shown in FIG. 4, a metal foreign substance 6, which is contaminated during manufacture or occurs during operation, may adhere to a creepage surface of the insulating spacer 30 within the grounded tank 2. At this time, a triple point T is formed by the metal foreign substance 6, the insulating spacer 30, and $SF_6$ gas, and an electric field is concentrated in the vicinity of the triple point T. When the creepage surface of the insulating spacer 30 is not coated with the nonlinear resistance layer 33, streamer discharge occurs at the tip of the metal foreign substance 6 and proceeds along the creepage surface of the insulating spacer 30 by the electric field concentration in the vicinity of the triple point T, causing dielectric breakdown between the high-voltage conductor 1 and the grounded tank 2. However, if the creepage surface of the insulating spacer 30 is coated with the nonlinear resistance layer 33, electric field concentration increases and conductivity of the nonlinear resistance layer 33 increases in the vicinity of the triple point T, achieving a relaxation effect of the electric field.

The nonlinear resistance layer 33 is preferably provided on the creepage surface of the insulating spacer 30 (with a gap 40 from the embedded conductor 31) to avoid contact with the conductor 31. When the creepage surface of the insulating spacer 30 is entirely coated with the nonlinear resistance layer 33, and if a high voltage such as a lightning impulse is applied, the conductivity of the nonlinear resistance layer 33 increases with an increase in creeping electric field, and thus the high-voltage conductor 1 may electrically connect with the grounded tank 2. At that time, current flows along the creepage surface of the nonlinear resistance layer 33, and thus heat capacity of the nonlinear resistance layer 33 is exceeded, leading to breakdown of the nonlinear resistance layer 33. As a result, ground fault may occur. However, the nonlinear resistance layer 33 is provided on the creepage surface of the insulating spacer 30 with a gap 40 from the conductor 31, thereby insulating performance is secured in a portion having no nonlinear resistance layer 33, and dielectric strength to be higher than impulse voltage is secured, making it possible to prevent dielectric breakdown at the creepage surface of the insulating spacer 30.

Figure 5:
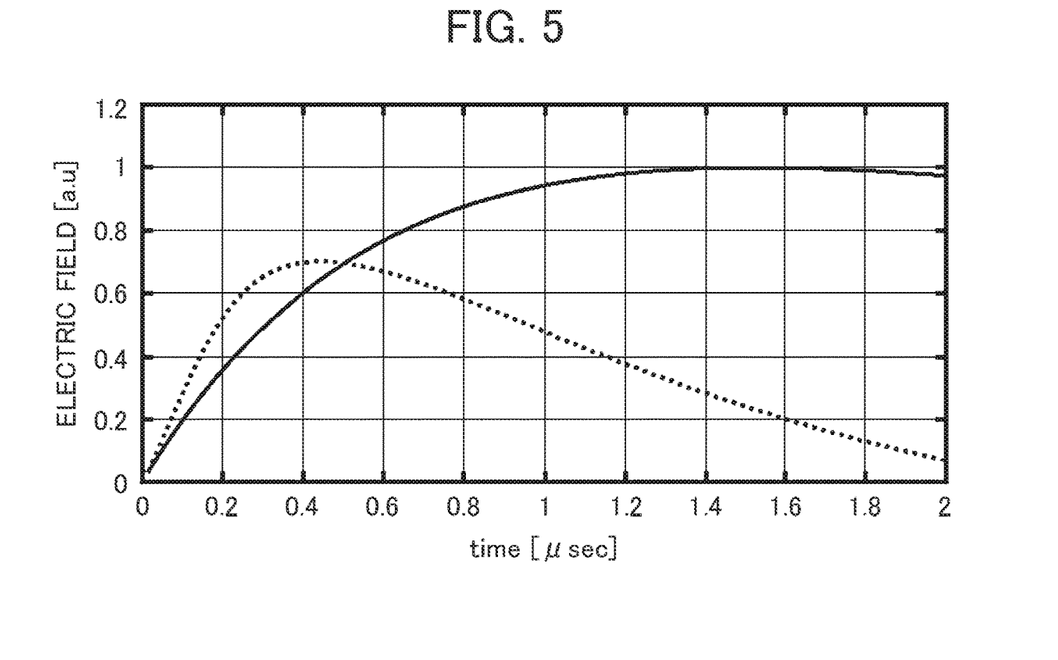
FIG. 5 is a graph showing a relationship between an electric field and elapsed time at a tripe point when a lightning impulse is applied to a high-voltage conductor.

FIG. 5 is a graph showing a relationship between an electric field and elapsed time at the tripe point when a lightning impulse is applied to the high-voltage conductor. In FIG. 5, the solid line shows an electric field value obtained through calculation for a case where the nonlinear resistance layer 33 is not provided on the creepage surface of the insulating spacer 30, and the dotted line shows an electric field value obtained through calculation for a case where the nonlinear resistance layer 33 is provided, i.e., for a case where the creepage surface of the nonlinear resistance layer 33 has the conductivity-to-field characteristics of FIG. 3. As shown in FIG. 5, providing the nonlinear resistance layer 33 relaxes the electric filed at the triple point T, making it possible to improve dielectric strength against adhesion of the metal foreign substance 6.

Figure 6:
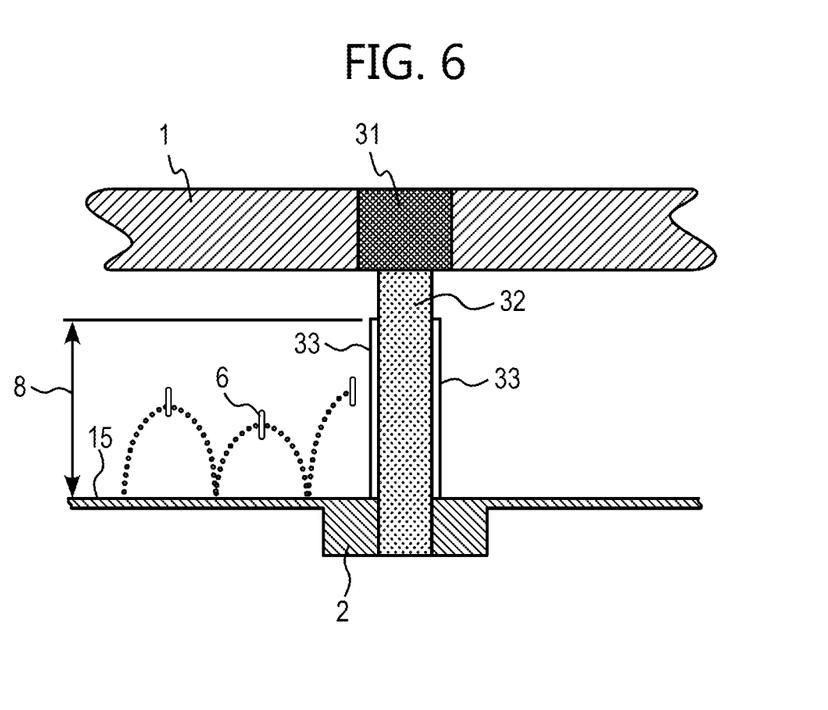
FIG. 6 schematically shows an orbit of the metal foreign substance within a grounded tank.

(2) Motional Range of Metal Foreign Substance on Creepage Surface of Insulating Spacer A motional range of metal foreign substance is now described. FIG. 6 schematically shows an orbit of the metal foreign substance within the grounded tank. The metal foreign substance 6 remains at rest on the bottom surface 15 of the grounded tank 2 during suspension of the gas insulation shutoff apparatus. The metal foreign substance is charged by an electric field generated during operation of the gas insulation shutoff apparatus, and receives electrostatic force in a flying direction from the bottom surface 15 of the grounded tank 2. The metal foreign substance 6 flies to a certain height in correspondence to phase change of applied voltage, and then returns back to the bottom surface 15 of the grounded tank 2, and flies again by the electrostatic force. As described above, the metal foreign substance 6 reciprocates within the grounded tank 2 between the grounded tank 2 and the high-voltage conductor 1. In FIG. 6, the dotted line shows an example of an orbit of motion of the metal foreign substance 6. The metal foreign substance 6 may adhere to the creepage surface of the insulating spacer 30 during such reciprocation. In the invention, therefore, a motional range (flying height) of the metal foreign substance 6 is calculated, and the nonlinear resistance layer 33 is provided in the motional range of the metal foreign substance on the creepage surface of the insulating structure 32. The range where the nonlinear resistance layer 33 is provided essentially contains a range 8 from the bottom surface 15 of the grounded tank 2 to the maximum flying height of the metal foreign substance 6.

Figure 7:
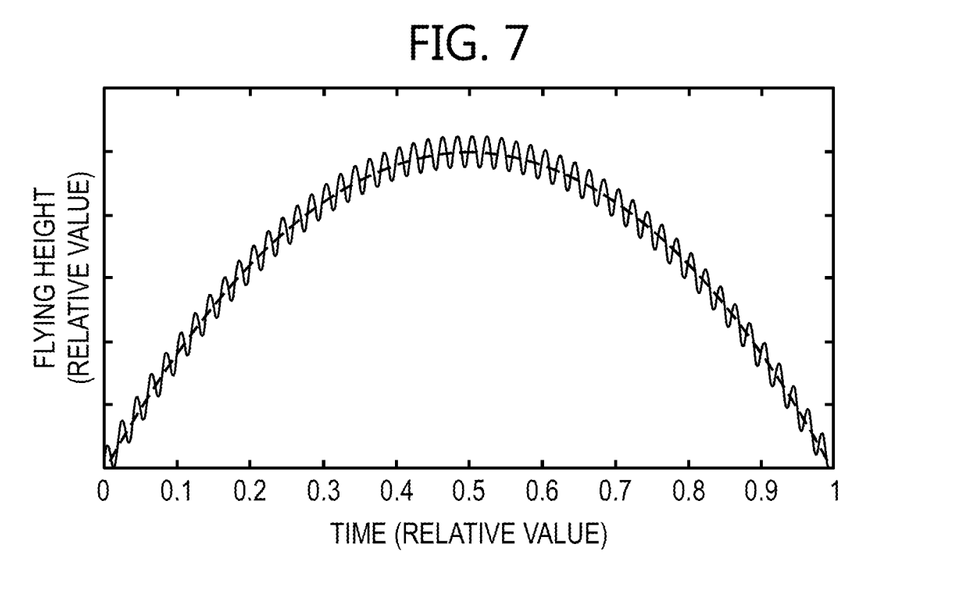
FIG. 7 is a graph showing an orbit of the metal foreign substance that flies from a bottom surface of the grounded tank and returns back to the bottom surface.

Calculation of the maximum flying height of the metal foreign substance is now described. FIG. 7 is a graph showing flying height of the metal foreign substance and elapsed time. In addition, FIG. 7 is a graph showing an orbit of the metal foreign substance 6 that flies from the bottom surface of the grounded tank 2 and returns back to the bottom surface. The metal foreign substance 6 receives electrostatic force and flies at initial velocity $v_0$, and then, as shown in FIG. 7, draws an orbit as a superposition of vertical throw up based on gravity and oscillation based on the electrostatic force. When the metal foreign substance 6 collides with the bottom surface of the grounded tank 2 n times, the equation of motion is represented by numerical expression (1).

Numerical Expression (1)

$$m\frac{d^2x}{dt^2} = -Q_n E \sin(\omega t) - mg \qquad (1)$$

In the expression (1), m is mass of the metal foreign substance, $Q_n$ is charge amount that the metal foreign substance 6 receives at the nth collision, $E\sin(\omega t)$ is electric field value on the bottom surface of the grounded tank 2 at a moment of the nth collision, and g is gravity acceleration.

In addition, $\omega$ is angular frequency of operation voltage. From the expression (1), flying velocity of the metal foreign substance 6 at the nth collision is represented by numerical expression (2).

Numerical Expression (2)

$$\frac{dx}{dt} = -\frac{Q_n E}{m\omega}(1 - \cos(\omega t)) - mgt + v_{n0} \qquad (2)$$

In the expression (2), $v_{n0}$ is initial velocity when the metal foreign substance 6 flies from the bottom surface of the grounded tank 2 immediately after the nth collision.

After the metal foreign substance 6 collides n times with the bottom surface of the grounded tank 2, the maximum height $H_{max}$ of the orbit can be approximated with numerical expression (3) from the expression of vertical throw up.

Numerical Expression (3)

$$H_{max} = \frac{v_{n0}^2}{2g} \qquad (3)$$

Gravity acts in a direction of lowering the metal foreign substance 6 toward the bottom surface of the grounded tank 2. On the other hand, electrostatic force acts in both directions, flying and lowering directions. Hereinafter, calculation is performed assuming the electrostatic force acts only in the flying direction for relatively severe evaluation. The initial velocity $v_0$ at a first flying moment is represented by numerical expression (4) from the numerical expression (2).

Numerical Expression 4

$$v_0 = -\frac{Q_n E}{m\omega}(1 - \cos(\omega t)) \tag{4}$$

The numerical expression (4) is time-integrated over a half period and averaged, thereby the average initial velocity $<v_0>$ can be obtained as represented by numerical expression (5).

Numerical Expression (5)

$$\langle v_0 \rangle = -\frac{Q_0 E}{m\omega} \tag{5}$$

Assuming the metal foreign substance 6 is a needle-like metal, charge amount Q of the metal foreign substance 6 charged at collision with the bottom surface of the grounded tank 2 is represented by numerical expression (6).

Numerical Expression (6)

$$Q = \frac{\pi \varepsilon_0 E l^2}{\ln(2l/r) - 1} \tag{6}$$

In the numerical expression (6), $\varepsilon_0$ is dielectric constant of vacuum, l is length of the needle-like foreign substance, and r is radius of the needle-like foreign substance.

An electric field on the bottom surface of the grounded tank 2 is represented by numerical expression (7), where a generatrix of the gas insulation shutoff apparatus is an infinitely long coaxial cylinder, outer radius of the high-voltage conductor 1 is $R_1$, inner radius of the grounded tank 2 is $R_2$, and electric potential of the high-voltage conductor is V.

Numerical Expression (7)

$$E = \frac{V}{R_2 \ln(R_2/R_1)} \tag{7}$$

Consequently, the average initial velocity $<v_0>$ is represented by numerical expression (8) from the numerical expressions (5), (6), and (7).

Numerical Expression (8)

$$\langle v_0 \rangle = -\frac{\varepsilon_0 E^2 l}{\omega r^2 \rho (\ln(2l/r) - 1)} \left( E = \frac{V}{\ln\left(\frac{R_2}{R_1}\right) R_2} \right) \tag{8}$$

In the expression (8), $\rho$ is density (determined by material of the metal foreign substance 6) of the metal foreign substance 6.

The initial velocity $v_{n0}$ after nth collision is now calculated. Collision of the metal foreign substance 6 with the bottom surface of the grounded tank 2 is inelastic collision. Assuming the same electric field value as an electric field value received at start of initial flying is received at first collision, initial velocity after the first collision is represented by numerical expression (9).

Numerical Expression (9)

$$v_{10}(<v_0> + e <v_0>) \tag{9}$$

In the expression (9), e is collision coefficient (<1).

Through calculation assuming similar collision is repeated, the initial velocity $v_{n0}$ after the nth collision is represented by numerical expression (10).

Numerical Expression (10)

$$v_{n0} = <v_0> + e^n <v_0> \tag{10}$$

Since the collision coefficient e is smaller than 1, even if collision is repeated infinite times, $v_{n0}$ is equal to or smaller than $2<v_0>$. In consideration of the above likelihood, the maximum flying height $H_{max}$ is analytically determined as represented by numerical expression (11).

Numerical Expression (11)

$$H_{max} = \frac{2v_0^2}{g} \left( v_0 = -\frac{\varepsilon_0 E^2 l}{\omega r^2 \rho \left( \ln\left(\frac{2l}{r}\right) - 1 \right)} \right) \tag{11}$$

Figure 8:
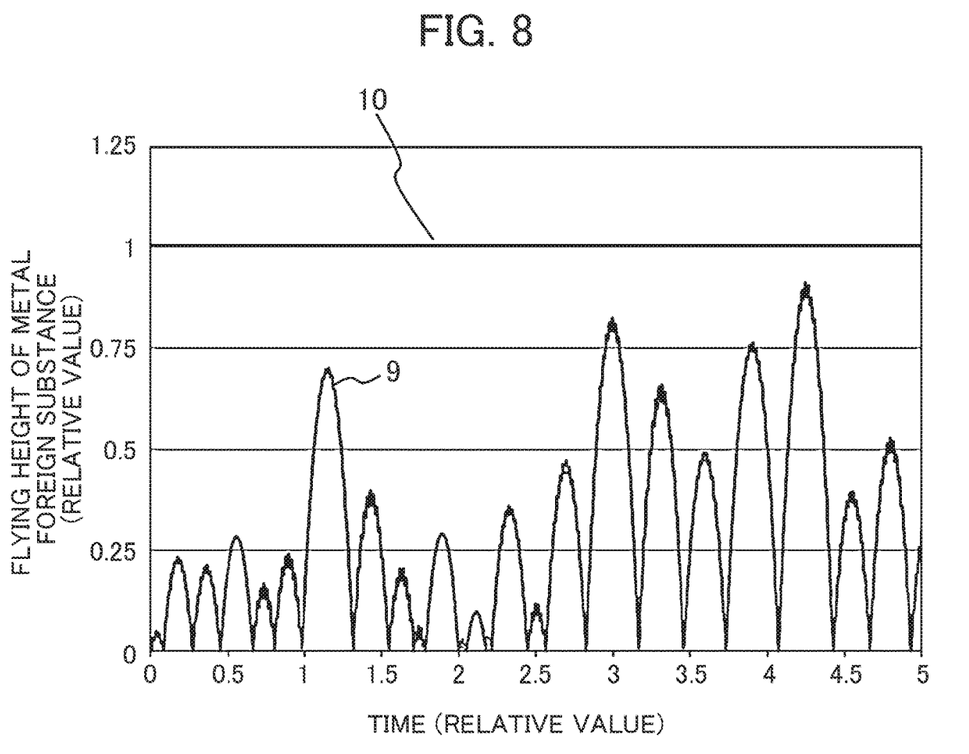
FIG. 8 is a graph showing a numerical solution and an analytical solution of flying height of the metal foreign substance.

FIG. 8 is a graph showing a numerical solution and an analytical solution of flying height of the metal foreign substance 6. In FIG. 8, the numerical solution 9 is a calculation result determined from the numerical expressions (1) and (2), and the analytical solution 10 is a calculation result determined from the numerical expression (10). For the calculation, material of the metal foreign substance 6 is aluminum, length l of the metal foreign substance 6 is 3 mm, radius r of the metal foreign substance 6 is 0.1 mm, outer radius $R_1$ of the high-voltage conductor 1 is 120 mm, inner radius $R_2$ of the grounded tank 2 is 500 mm, applied voltage V to the high-voltage conductor 1 is 500 kV, and frequency is 50 Hz. As illustrated in FIG. 8, the maximum flying height $H_{max}$ of the analytical solution is higher than any flying height of the numerical solution, showing enough likelihood. Hence, a value obtained by the numerical expression (10) for the nonlinear resistance layer 33 is determined as the minimum height of the nonlinear resistance layer 33 from the bottom surface of the grounded tank 2.

Since the nonlinear resistance layer 33 is provided with a gap from the high-voltage conductor 1, an electric field is concentrated at an end to be a high-field end of the nonlinear resistance layer 33 on a side close to the high-voltage conductor 1. A dielectric breakdown filed of the $SF_6$ gas can be represented by numerical expression (12).

Numerical Expression (12)

$$E = 8.9P \text{ (kv/mm)} \tag{12}$$

Consequently, the maximum height of the nonlinear resistance layer 33 is set such that the electric field at the end of the nonlinear resistance layer 33 does not exceed the value of the numerical expression (12) so as to prevent dielectric breakdown at the end of the nonlinear resistance layer 33.

As described above, a motional range of the metal foreign substance and a disposition range of the nonlinear resistance layer 33, in which dielectric breakdown does not occur at the end of the nonlinear resistance layer 33, are each between the bottom surface of the grounded tank 2 and the high-voltage conductor 1. That is, such ranges exist in a lower half region of the grounded tank 2. In this embodiment, as shown in FIGS. 2A and 2B, the nonlinear resistance layer 33 is provided in the entire periphery of the wide surface of the insulating spacer 30 such that the grounded tank 2 containing the insulating spacer 30 may be displaced in any direction.

As described above, in the invention, the nonlinear resistance layer 33 is provided after the motional range of the metal foreign substance is specified on the creepage surface of the insulating spacer 30. This is a non-conventional idea. According to the configuration of the invention, since no cylindrical barrier structure section needs to be provided unlike in the patent literature 1, an insulating spacer and a gas insulation shutoff apparatus, each having a high dielectric strength against adhesion of the metal foreign substance, can be provided without increasing size or complicating a shape of the metal foreign substance.

(3) Configuration of Nonlinear Resistance Layer

The nonlinear resistance material constituting the nonlinear resistance layer 33 may be any material used in the past without limitation. For example, a composite material to be preferably used includes a resin containing zinc oxide (ZnO), silicon carbide (SiC), or a mixture of them added as fillers thereto. For the resin, the same material as a resin material (for example, epoxy resin) constituting the insulating structure 32 is preferably used. The same material for the insulating structure 32 is used as the resin of the nonlinear resistance layer 33, making it possible to reduce a difference in thermal expansion coefficient between the nonlinear resistance layer 33 and the insulating structure 32, and improve adhesion therebetween.

The content of the fillers in the nonlinear resistance layer 33 is preferably 1 to 60 mass %. If the content is less than 1 mass %, the nonlinear resistance layer 33 cannot sufficiently exhibit its field relaxation effect. If the content is more than 60 mass %, proportion of the resin in the nonlinear resistance layer 33 is reduced, leading to an increase in viscosity of a coating liquid of the nonlinear resistance layer 33, so that productivity is extremely reduced.

The nonlinear resistance layer 33 preferably has a thickness of 20 μm to 5 mm. If the thickness is less than 20 μm, the nonlinear resistance layer 33 cannot sufficiently exhibit the field relaxation effect. If the thickness is more than 5 mm, long time is taken for drying after application of the nonlinear resistance layer 33, so that productivity is reduced.

Average particle diameter of the fillers is also important for the nonlinear resistance layer 33 to sufficiently exhibit the field relaxation effect, and is preferably 10 nm to 100 μm. The average particle diameter of less than 10 nm results in agglomeration of the fillers and a reduction in dispersibility of the fillers in the resin, which prevents formation of a uniform layer, so that the field relaxation effect cannot be sufficiently exhibited. The average particle diameter of larger than 100 μm reduces the ratio of the resin, so that the field relaxation effect cannot be sufficiently exhibited.

The nonlinear resistance layer 33 can be produced as follows: the fillers are mixed into the above-described resin to prepare a coating liquid, and the coating liquid is applied on the creepage surface of the insulating structure 32 and dried.

Second Embodiment

Figure 9:
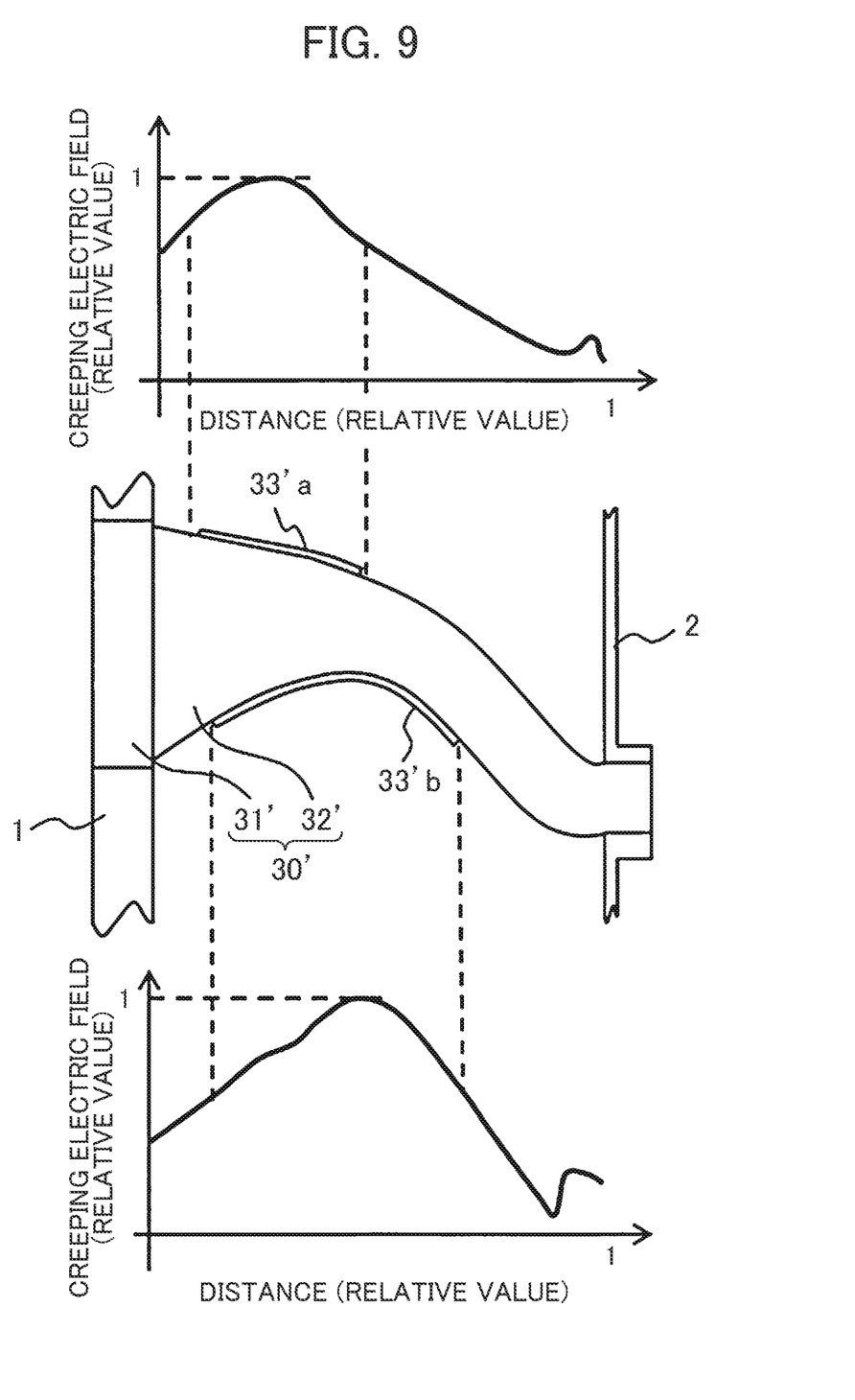
FIG. 9 includes a schematic sectional view showing the periphery of an insulating spacer and a view showing distribution of a creeping electric field in a second embodiment.

FIG. 9 includes a schematic sectional view showing the periphery of an insulating spacer and a view showing distribution of a creeping electric field in a second embodiment. Although the first embodiment has been described with a case of using the disc-like spacer, the second embodiment is described with a case of using a conical spacer. The conical spacer 30' has a conical shape to extend the creeping distance of the insulating spacer and thus secure insulating performance against the metal foreign substance 6. The conical spacer 30' has an electric field distribution unique to its shape. Specifically, part of the creepage surface of the conical spacer 30' has a higher electric field than the vicinity of the high-voltage conductor 1. As shown in the upper and lower graphs of FIG. 9, wide surfaces on both sides of the conical spacer 30' have different types of distribution of the creeping electric field. In the second embodiment, therefore, as shown in FIG. 9, nonlinear resistance layers 33'a and 33b are applied on respective portions, each having a high creeping electric field, of the wide surfaces on both the sides. This makes it possible to improve dielectric strength of a portion with low insulation of the creepage surface, and improve the insulating performance of the conical spacer 30'.

The nonlinear resistance layers 33'a and 33b are each preferably provided in a portion having an electric field of at least 70% of a peak value (maximum value) of the creeping electric field. Providing the nonlinear resistance layer in a portion having such an electric field value allows the nonlinear resistance layer to sufficiently exhibit the field relaxation effect.

As described above, according to the invention, an insulating spacer and a gas insulation shutoff apparatus, each having a high dielectric strength against adhesion of a metal foreign substance, can be provided without increasing size or complicating a shape of the insulating spacer.

The invention is not limited to the above-described embodiments, but includes various modifications. For example, the above-described embodiments have been described in detail to clearly explain the invention, and the invention is not necessarily limited to the embodiments each having all the described configurations. In addition, part of a configuration of one embodiment can be substituted for a configuration of another embodiment, and a configuration of one embodiment can be added to a configuration of another embodiment. Furthermore, a configuration of one embodiment can be added to, eliminated from, or substituted for part of a configuration of another embodiment.

LIST OF REFERENCE SIGNS

1: High-voltage conductor, 2: Grounded tank, 30, 30': Insulating spacer, 31, 31': Conductor, 32, 32': Insulating structure, 33, 33'a, 33'b: Nonlinear resistance layer, 6: Metal foreign substance, T: Triple point formed by metal foreign substance, insulating spacer, and insulating gas, 8: Height of nonlinear resistance layer, 20: Breaker, 9: Numerical solution of maximum flying height of metal foreign substance, 10: Analytical solution of maximum flying height of metal foreign substance, 21: Disconnector, 22: Grounding switch, 23: Current transformer, 24: Transformer, 25, 26: Generatrix, 100: Gas insulation shutoff apparatus

The invention claimed is:

1. An insulating spacer of a gas insulation shutoff apparatus including a grounded tank filled with an insulating gas, a high-voltage conductor provided within the grounded tank, and the insulating spacer supporting and fixing the high-voltage conductor within the grounded tank, the insulating spacer comprising:

a conductor connected to the high-voltage conductor;
an insulating structure supporting and fixing the conductor within the grounded tank; and
a nonlinear resistance layer provided on a creepage surface of the insulating structure,
wherein the nonlinear resistance layer is provided in a portion that is a high-field portion of the creepage surface of the insulating structure, a first end of the nonlinear resistance layer is in contact with the grounded tank, a gap, in which the nonlinear resistance layer is not provided on the creepage surface, is arranged between the conductor and a second end of the nonlinear resistance layer that is opposite to the first end, and the second end is uncovered,
wherein the nonlinear resistance layer is provided so as to cover a motional range of a metal foreign substance on the creepage surface of the insulating structure, and
wherein the motional range essentially includes a first range from a bottom surface of the grounded tank to a maximum flying height of the metal foreign substance, and includes a second range from the maximum flying height to a height causing no dielectric breakdown starting from an end of the nonlinear resistance layer,
wherein the high-field portion has an electric field value of at least 70% of a maximum value of a creeping electric field of the insulating structure, and
wherein the nonlinear resistance layer has a thickness of at least 20 μm and less than 5 mm.

2. The insulating spacer according to claim 1, wherein the nonlinear resistance layer contains epoxy resin and fillers including zinc oxide, silicon carbide, or a mixture of the zinc oxide and the silicon carbide.

3. The insulating spacer according to claim 2, wherein the content of the fillers in the nonlinear resistance layer is 1 to 60 mass %.

4. The insulating spacer according to claim 2, wherein average particle diameter of the fillers is 10 nm to 100 μm.

5. A gas insulation shutoff apparatus, comprising:
a grounded tank filled with an insulating gas;
a high-voltage conductor provided within the grounded tank; and
an insulating spacer supporting and fixing the high-voltage conductor within the grounded tank,
wherein the insulating spacer includes a conductor connected to the high-voltage conductor, an insulating structure supporting and fixing the conductor within the grounded tank, and a nonlinear resistance layer provided on a creepage surface of the insulating structure, and
wherein the nonlinear resistance layer is provided in a portion that is a high-field portion of the creepage surface of the insulating structure, a first end of the nonlinear resistance layer is in contact with the grounded tank, a gap, in which the nonlinear resistance layer is not provided on the creepage surface, is arranged between the conductor and a second end of the nonlinear resistance layer that is opposite to the first end, and the second end is uncovered,
wherein the nonlinear resistance layer is provided so as to cover a motional range of a metal foreign substance on the creepage surface of the insulating structure, and
wherein the motional range essentially includes a first range from a bottom surface of the grounded tank to a maximum flying height of the metal foreign substance, and includes a second range from the maximum flying height to a height causing no dielectric breakdown starting from an end of the nonlinear resistance layer,
wherein the high-field portion has an electric field value of at least 70% of a maximum value of a creeping electric field of the insulating structure, and
wherein the nonlinear resistance layer has a thickness of at least 20 μm and less than 5 mm.

6. The gas insulation shutoff apparatus according to claim 5, wherein the nonlinear resistance layer contains epoxy resin and fillers including zinc oxide, silicon carbide, or a mixture of the zinc oxide and the silicon carbide.

7. The gas insulation shutoff apparatus according to claim 6, wherein the content of the fillers in the nonlinear resistance layer is 1 to 60 mass %.

8. The gas insulation shutoff apparatus according to claim 6, wherein average particle diameter of the fillers is 10 nm to 100 μm.

* * * * *